United States Patent [19]
Hansen

[11] 3,742,370
[45] June 26, 1973

[54] SOFT START A.C. MOTOR CONTROL
[75] Inventor: James E. Hansen, Milwaukee, Wis.
[73] Assignee: Cutler-Hammer, Inc., Milwaukee, Wis.
[22] Filed: Dec. 20, 1971
[21] Appl. No.: 210,023

[52] U.S. Cl. .................. 318/227, 318/230, 318/416
[51] Int. Cl. ............................................ H02p 5/40
[58] Field of Search .................... 318/227, 230, 231, 318/416

[56] References Cited
UNITED STATES PATENTS
3,189,810  6/1965  MacGregor ......................... 318/227
3,652,924  3/1972  Dieterich et al. ................ 318/227 X
3,573,580  4/1971  Shinozaki ........................... 318/227

Primary Examiner—Gene Z. Rubinson
Attorney—Hugh R. Rather et al.

[57] ABSTRACT

A soft start control for a delta-connected motor or an ungrounded Y-connected (star-connected) motor or the like polyphase system. To reduce the accelerating torque of a polyphase motor and thereby obtain a soft start characteristic that reduces stress and strain on the driven parts until normal running speed is reached, a gated A.C. switching device such as a triac is used in the power lines of the polyphase A.C. source. A simple time delay firing circuit connected across each triac controls the latter so that current flow is interrupted in each of the phases for a predetermined period of time during each half-cycle in repetitive sequence, the net effect being to reduce the effective voltage applied to the motor. After a predetermined time of reduced voltage acceleration sufficient to bring the motor up to or near running speed, a timer controls the firing circuit to apply full line voltage to the motor.

12 Claims, 3 Drawing Figures

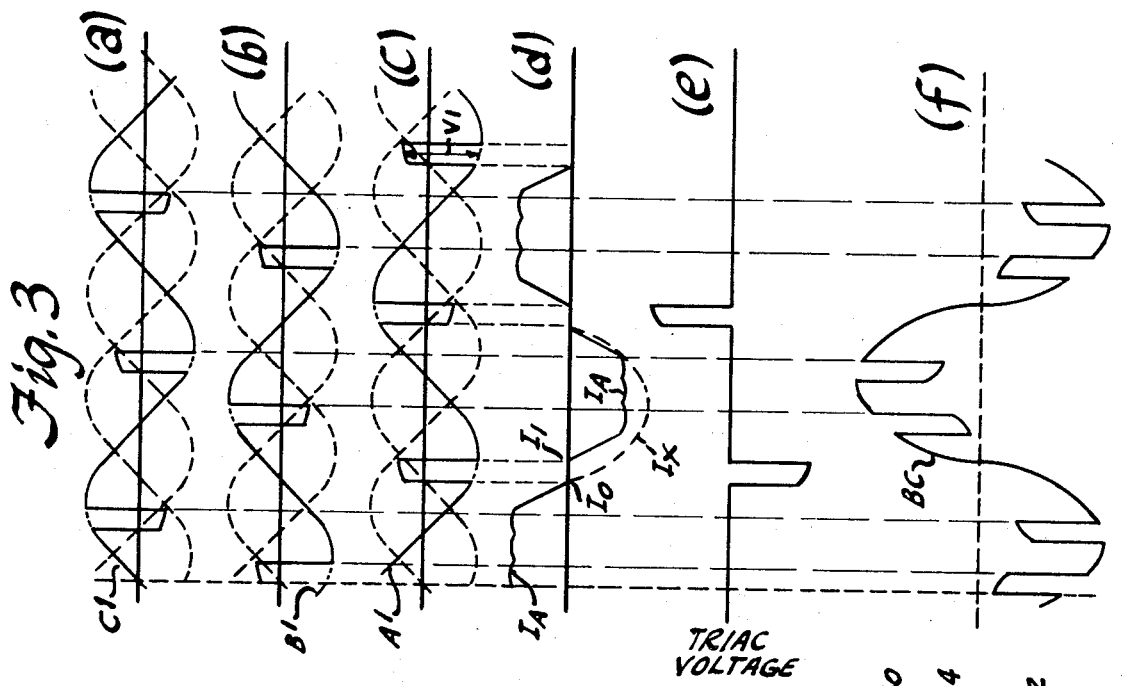
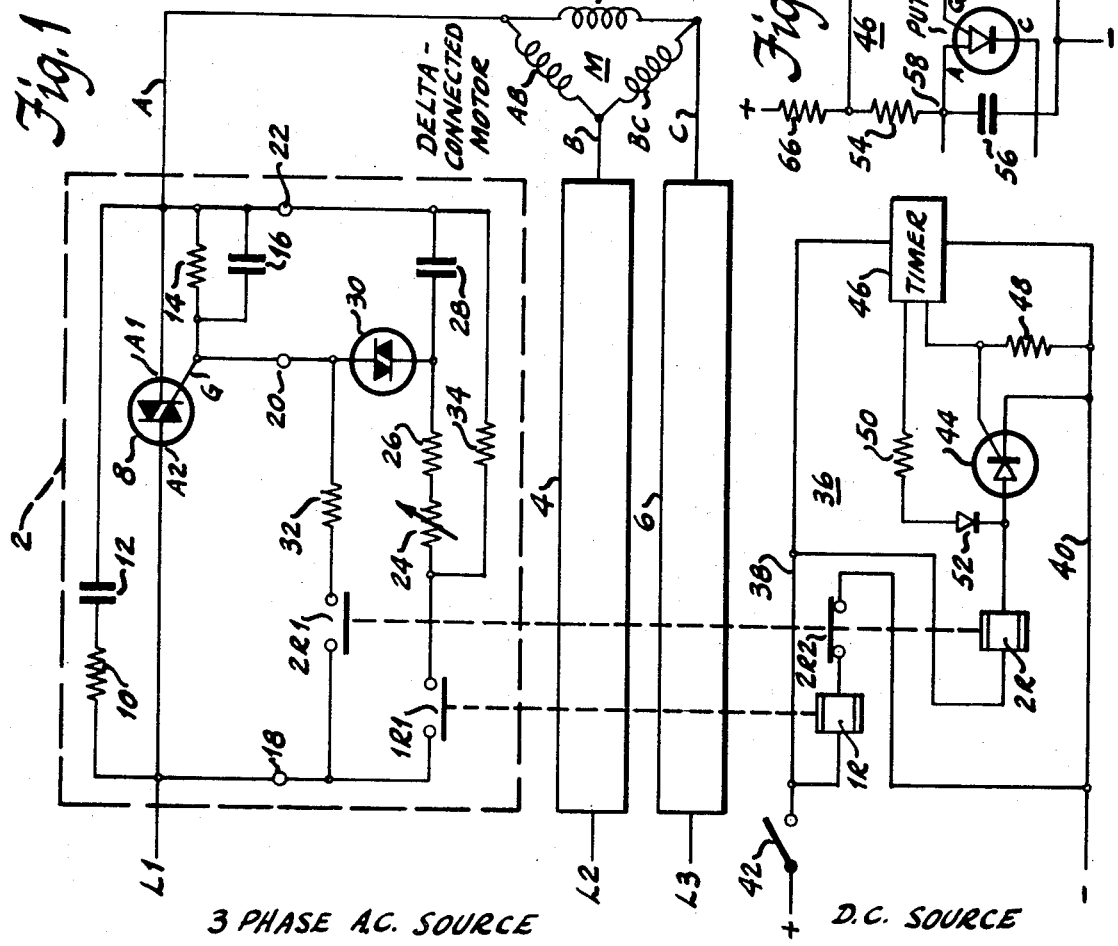

SOFT START A.C. MOTOR CONTROL

BACKGROUND OF THE INVENTION

Soft start motor controls have been known heretofore. Techniques such as resistors or reactors in series with the motor have been known. It has also been known to use SCR's in reverse-parallel connection in one phase of a polyphase system; however, this has the disadvantage that the motor would be very unbalanced. Furthermore, SCR's have been used in reverse-parallel in each phase of a three-phase system, but these systems have required complex firing circuits for control of the six SCR's.

This invention relates to improvements thereover.

SUMMARY OF THE INVENTION

This invention relates to a soft start polyphase motor control.

An object of the invention is to provide an improved soft start control for a polyphase A.C. load.

A more specific object of the invention is to provide a simplified soft start control for a delta-connected motor, ungrounded Y-connected motor, or the like.

Another specific object of the invention is to provide simplified firing circuits for bidirectional thyristor means in a plurality of phases of a polyphase system.

Another specific object of the invention is to provide improved and simplified firing control circuits for the bidirectional thyristor means in the respective phases of a polyphase A.C. powered circuit.

Another specific object of the invention is to provide improved and simplified firing control means for the bidirectional thyristor means in the respective phases of a three-phase system supplying a delta-connected or ungrounded Y-connected motor whereby to provide timed, reduced-torque acceleration.

Another specific object of the invention is to provide a soft start control for a polyphase load that has a small size, very low power or heat dissipation, adjustability, and low cost.

Another specific object of the invention is to provide a soft start control of the aforementioned type that may also be used as an on-off control for the load, allowing the load to be turned on or off from a low power signal.

Other objects and advantages of the invention will hereinafter appear.

BRIEF DESCRIPTION OF THE DRAWINGS

FIG. 1 is a circuit diagram of a soft start A.C. motor control system constructed in accordance with the invention;

FIG. 2 is a circuit diagram of a timer usable in the system of FIG. 1; and

FIG. 3 is a graph showing operating characteristics of the system of FIG. 1.

DESCRIPTION OF THE PREFERRED EMBODIMENT

Referring to FIG. 1, there is shown a soft start A.C. motor control system according to the invention. This system is powered from a three-phase A.C. source through power supply lines L1, L2 and L3.

This system comprises three like motor power control circuits 2, 4 and 6, one for each phase of the three-phase source. As shown in FIG. 1, power control circuit 2 is connected between line L1 and conductor A. Power control circuit 4 is connected between line L2 and conductor B. And power control circuit 6 is connected between line L3 and conductor C. Since power control circuits 4 and 6 are similar to power control circuit 2, they have been shown schematically as rectangles to avoid complicating the drawing.

In this system, conductors A, B and C are connected to the three terminals of the three-phase load which in this case is a delta-connected A.C. motor M.) an ungrounded Y-connected motor could be controlled is "this system, or other like three-phase load. Conductors A, B and C correspond to waves A', B' and C', respectively, in FIG. 3 as hereinafter more fully described.

As shown in FIG. 1, power control circuit 2 comprises switching means for interrupting current flow from line L1 to the motor for an adjustable period of time during each A.C. half-cycle in repetitive sequence. This means comprises a bidirectional thyristor device such as a triac 8 connected at its main conduction terminals A2 and A1 between line L1 and conductor A.

A dv/dt control circuit comprising a resistor 10 and a capacitor 12 in series connection is connected across anodes A1 and A2 of triac 8.

A noise suppression network comprising a resistor 14 and a capacitor 16 in parallel connection is connected between gate G and anode A1 of the triac to suppress noise voltages that might be picked especially as a result of connecting the firing control circuit from a remote location through long conductors to the triac at terminals 18, 20 and 22.

The firing control circuit for the triac comprises means for applying a trigger pulse to the gate of the triac a predetermined, timed interval after the triac stops conducting. This means comprises an RC circuit comprising adjustable resistor 24, fixed resistor 26 and capacitor 28, and a symmetrical trigger diode comprising a diac 30. As shown in FIG. 1, the aforementioned terminals 18, 20 and 22 are connected to anode A2, gate G and anode A1 of the triac, respectively. Resistors 24 and 26 and capacitor 28 are connected in series in that order from terminal 18 to terminal 22, there being a normally open contact 1R1 of start relay 1R between terminal 18 and resistor 24 for closing this RC circuit. The junction between resistor 26 and capacitor 28 is connected through diac 30 to terminal 20 and, thus, to the gate of the triac.

The firing control circuit also comprises means for shunting the same to allow full conduction of the triac throughout each half-cycle. This means comprises a resistor 32 connected in series with a normally open contact 2R1 of full voltage applying relay 2R between terminal 18 and terminal 20. As will be apparent, closure of contact 2R1 completes a firing signal path from line L1 through the gate-anode A1 junction of the triac to fire the triac at the beginning of each current half-cycle.

The firing control circuit also comprises means that helps to eliminate false commutation due to the rapid voltage rise characteristic, the latter being present because zero current crossover does not correspond to zero voltage due to the inductive nature of the load. This means comprises a resistor 34 connected in series with normally open contact 1R1 across the triac anodes A1 and A2.

Power control circuits 4 and 6 are similar to power control circuit 2 hereinbefore described. Relay 1R is provided with two additional contact similar to contact 1R1, these two additional contacts performing similar functions in circuits 4 and 6, respectively. Relay 2R is provided with second and third contacts for circuits 4 and 6, respectively, for performing functions similar to contact 2R1.

The system is also provided with means for controlling the power control circuits to effect starting, acceleration, running and stopping of the motor. This means comprises a control circuit 36 common to the three power control circuits. As shown in FIG. 1, control circuit 36 comprises positive and negative power conductors 38 and 40, respectively, supplied from a D.C. source, positive conductor 38 being connected to the positive side of this D.C. source through a manual "on-off" switch 42 that is normally open. The coil of relay 1R is connected through a normally closed interlock contact 2R1 of relay 2R across conductors 38 and 40. Relay 1R is a soft start control relay.

This common control circuit also comprises means for terminating the acceleration period. This means comprises relay 2R having its coil connected in series with the anode and cathode of an SCR (semiconductor controlled rectifier) 44 across conductors 38 and 40. A timer 46 is connected across conductors 38 and 40 and its output is connected to the gate of the SCR to provide a firing pulse thereto when the timer times out. A resistor 48 is connected between the gate and cathode of the SCR to limit gate current. A clamping circuit comprising a resistor 50 and a unidirectional diode 52 in series is connected from the timer to the anode of the SCR and through the latter to negative conductor 40. This clamping circuit clamps the timer so that it will not continue pulsing after it has fired the SCR into conduction, as hereinafter described in connection with FIG. 2. Diode 52 blocks current flow through the relay coil into the timer.

While timer 46 may take various forms, a circuit usable in FIG. 1 is shown in FIG. 2. This timer circuit comprises a bridge having a resistor 54 and a capacitor 56 in one branch forming an RC timing circuit, with an output junction 58 therebetween. A pair of resistors 60 and 62 form a parallel branch of the bridge circuit having a control junction 64 therebetween. Positive supply voltage is supplied to the upper side of this bridge through a resistor 66 while the lower side thereof is connected directly to the negative side of the D.C. source. A programmable unijunction transistor PUT has its anode A connected to junction 58 and has its gate G connected to junction 64. Cathode C of the PUT is the output. The clamping circuit is connected to junction 58 to shunt capacitor 56 when the SCR is fired into conduction.

The timer operates to supply a current pulse from cathode C of the PUT a predetermined time interval after voltage is applied to the timer. For this purpose, following application of voltage, current flows through resistors 66 and 54 to charge capacitor 56. Current also flows through resistors 66, 60 and 62 whereby a predetermined voltage is applied from junction 64 to the gate of the PUT. When the voltage on capacitor 56 that is applied to the anode exceeds the gate voltage, the PUT triggers into conduction. As a result, capacitor 56 discharges through the anode-cathode junction thereof to apply a current pulse to the gate of the SCR. This fires the SCR into conduction for purposes hereinafter described.

OPERATION

When it is desired to start the motor, switch 42 is closed. As a result, relay 1R is energized to close contact 1R1 and corresponding contacts in circuits 4 and 6. The operation of circuit 2 will be described with reference to curve A' in FIG. 3(c) and it will be seen that circuits 4 and 6 operate in a similar manner in their respective phases as shown by curves B' and C', respectively, in FIG. 3(b) and (a).

Upon closure of contact 1R1, current flows to charge capacitor 28 at a rate selected by adjustment of resistor 24. Resistor 26 provides an approximate rate from which the charging current flow can be adjusted. When the voltage on capacitor 28 reaches a predetermined value, diac 30 triggers into conduction and a pulse of current flows into the gate of triac 8 to fire the triac into conduction. This charging of the capacitor and triggering of the diac occurs symmetrically on each half-cycle of phase A' of the three-phase voltage. Each time the current in the triac goes to or near zero, the triac stops conducting and must be refired into conduction on the next half-cycle of source voltage. This RC delay circuit, in effect, delays firing of the triac so that the latter remains non-conducting for a predetermined period of time during each half-cycle.

This is shown by curve A' in FIG. 3(c). When the current shown by curve $I_A$ in FIG. 3(d) decreases to zero, this being the current flowing through conductor A to the motor, triac 8 turns off at point $I_0$ so that no current flows to the motor from line L1. Triac 8 will stay off until refired into conduction at point L1. Triac 8 will stay off until refired into conduction at point $L_1$. Curve Ix shows generally how much greater the current would be on each half-cycle without the soft start feature.

When the triac ceases conduction, it immediately transfers from a low impedance path to a near infinite impedance. In the three-phase system, a voltage V1 results across the triac which is the difference between the instantaneous voltage on the line side of the triac and the resultant voltage on the load side of the open triac produced by the divided difference of the values of the voltages impressed on the other two sides. As shown in FIG. 3(c), the voltage V1 on conductor A will be one-half (divided) the difference between the voltage of the other two phases B' and C' shown in dotted lines. The voltages of phases B' and C' are combined in motor winding BC and the resultant is divided into one-half by windings AB and AC to apply a voltage on conductor A. This voltage is further altered by any motor-generated voltages to provide voltage V1. This voltage wave form is shown in FIG. 3(e).

This voltage across the triac charges capacitor 28 until the voltage thereon reaches the trigger value of diac 30 at point $I_1$, in FIG. 3(d) at which time the charge on the capacitor is "dumped" into the gate of the triac due to the diac's negative resistance characteristic. At this time, the triac is fired into conduction, switching current on again through this line. In this state, the voltage across the triac drops down near zero as shown by the curve in FIG. 3(e). This action occurs on every half-cycle, beginning each time the current through the triac decreases to zero.

The same action occurs on each of the other two lines, except at 120° phase differences. This action follows the rotation of the three-phase line synchronously.

This action requires that only one triac be off at any given time so that there is always a current path through the motor windings.

Further insight into the operation can be derived by carefully analyzing the wave forms shown in FIG. 3. Although a delta load (no neutral) is being used, the voltage wave forms applied to the motor windings with respect to a "source neutral" help considerably in graphically analyzing the operation of the system. For instance, the voltage that occurs across the triac when it crosses through zero current can be seen to be the difference between the line voltage on the one side and the combined voltages of the other two lines divided across the motor windings on the other side. Zero current crossover does not correspond to zero voltage across the triac due to the inductive nature of the load as can be seen from the curves in FIG. 3(c) and (d). The dv/dt circuit consisting of resistor 10 and capacitor 12 across the triac and resistor 34 (in conjunction with the load inductance) similarly across the triac, and similar circuits across the other two triacs, help to eliminate false commutation due to the rapid voltage rise at point $I_0$ as shown by the curves in FIG. 3(c) and (d).

Returning to the operation of common control circuit 36, it will be recalled that switch 42 was closed to energize relay 1R. This switch also applies D.C. power to timer 46 to start this timer timing. When the timer times out, it fires SCR 44 into conduction to energize relay 2R. This relay closes its contact 2R1 in circuit 2 and similar contacts in circuits 4 and 6. Contact 2R1 completes a triac firing circuit through resistor 32 in shunt of the time delay firing circuit. This firing circuit fires the triac into conduction at the beginning of each half-cycle to apply full voltage to the motor for running.

As will be apparent, timer 46 is set to time the motor acceleration at reduced voltage for soft start for a period of time sufficient to allow the motor to reach full or near running speed as required to avoid application of excessive torque on the drive.

The curve BC in FIG. 3(f) shows how much the line to line power to the motor is reduced, this being a curve showing the voltage on conductor B with respect to conductor C.

The system provides excellent symmetry of the line current wave forms, a factor that is extremely important since any lack of symmetry would provide D.C. components which would cause braking effects, very high transient currents and rough operation.

The width of the "notch" wave form, notch V1 in FIG. 3(c), is adjustable from a full on, zero degree notch, up to some-what below 60° wide per one-half cycle. This is done by adjustment of resistor 24 in each power control circuit 2, 4 and 6. Observation of the wave forms shows that that much adjustment is possible while insuring that at least two lines are conducting at any given period of time. This available range is usually quite adequate to provide a sufficient span of power adjustment for most applications.

Use of this invention is not limited to motor or inductive loads.

Although the exemplary system disclosed is shown as applied to starting a motor, it is conceivable that such a phase controlling technique could be used as a continuously connected speed control or power control system, with the understanding that its adjustment range is limited.

While a triac has been shown, it will be apparent that other A.C. switching means such as reverse-parallel connected SCR's could be used in place thereof for other power applications with suitable means of isolating the diac such as with a pulse transformer.

While the system hereinbefore described is effectively adapted to fulfill the objects stated, it is to be understood that the invention is not intended to be confined to the particular preferred embodiment of soft start A.C. motor control disclosed, inasmuch as it is susceptible of various modifications without departing from the scope of the appended claims.

I claim:

1. A soft start polyphase control system comprising:
    a polyphase A.C. supply source;
    a polyphase A.C. load device having terminals;
    a plurality of gating type bidirectional switching means;
    means comprising power lines connecting said plurality of gating type bidirectional switching means between a plurality of the phases of said source and a plurality of said load terminals, respectively;
    a plurality of time-delay firing circuits connected for energization across the respective gating type bidirectional switching means, each said firing circuit being operable when the current in the associated gating type bidirectional switching means decreases to zero to delay refiring of the latter for a predetermined adjustable time interval thereby to interrupt for time intervals cyclically the current flow to the load device to reduce the power for soft starting;
    a plurality of no-delay firing circuits connected for by-passing the respective time-delay firing circuits, each being operable to fire the respective gating type bidirectional switching means into conduction at the beginning of each voltage half-cycle applied to the latter thereby to apply full power to the load device;
    and control means common to said time-delay and no-delay firing circuits comprising:
    means for initiating operation of the system including switching means responsive thereto for rendering said time-delay firing circuits operative thereby to apply reduced power to the load device for soft starting;
    timing means responsive to said initiation of operation of the system;
    and means responsive to said timing means after a predetermined time interval for rendering said no-delay firing circuits operative thereby to apply full power to the load device.

2. The invention defined in claim 1, wherein said soft start polyphase control system also comprises:
    a plurality of dv/dt networks connected across the respective gating type bidirectional switching means.

3. The invention defined in claim 2, wherein said soft start polyphase control system further comprises:
    a plurality of resistors connected cross the respective time-delay firing circuits so as to be in parallel with the respective gating type bidirectional switching means when the associated time-delay firing circuit is rendered operative and to be disconnected by said switching means at other times.

4. The invention defined in claim 3, wherein said polyphase A.C. load device comprises:

a delta connected A.C. motor having three phase terminals that are energized through three of said gating type bidirectional switching devices from three phases of said A.C. supply source, respectively.

5. The invention defined in claim 1, wherein said time-delay firing circuits comprise:

means for adjusting said delayed symmetrical refiring of each gating type bidirectional switching device from zero delay (full on) to a phase angle short of any overlapping with a similar current interruption time interval in any of the other phases of the polyphase system.

6. The invention defined in claim 1, wherein each said time-delay firing circuit comprises:

an RC time-delay circuit connected across the gating type bidirectional switching means;

and a symmetrical trigger diode connected between said RC time delay circuit and the gate of said gating type bidirectional switching means.

7. The invention defined in claim 1, wherein said soft start polyphase control system also comprises:

long conductors connecting said time-delay and no-delay firing circuits from remote locations to the respective gating type bidirectional switching means;

and a noise voltage suppressor circuit connected to each gating type bidirectional switching means to suppress any noise voltages that may be picked up by said long conductors.

8. A soft start control system for controlling energization of a three-phase delta-connected or ungrounded Y-connected A.C. motor from a three-phase A.C. supply source comprising:

three power lines each including a triac connecting the source to the motor;

a time delay firing circuit energized across each said triac for firing the associated triac into conduction;

and control means common to said triacs comprising:

on-off means operable to start and stop the motor;

means responsive to operation of said on-off means to start the motor for rendering said time-delay firing circuits effective to control application of reduced power to the motor;

and means operable after a predetermined acceleration period for controlling said triacs to apply full line voltage to the motor.

9. The invention defined in claim 8, wherein each said time-delay firing circuit comprises:

an RC circuit connected for energization from across the anodes of the respective triac;

and a symmetrical trigger diode connected from the junction of said RC circuit to the gate of the associated triac.

10. The invention defined in claim 9, wherein said soft start control system also comprises:

a dv/dt network comprising a resistor and a capacitor connected across each said triac;

and a damping circuit connected across each RC time-delay firing circuit.

11. The invention defined in claim 10, wherein said damping circuit comprises:

a resistor connected across each said time-delay firing circuit whereby this resistor becomes connected across the associated triac when said time-delay firing circuit is rendered effective.

12. The invention defined in claim 11, wherein said means operable after a predetermined acceleration period for controlling said triacs comprises:

a timer for timing a predetermined time interval from the time of operation of said on-off means;

and switching means responsive to said timer timing out at the end of said predetermined time interval for shunting each time-delay firing circuit to cause full line voltage firing of said triacs.

* * * * *